United States Patent [19] [11] Patent Number: 4,623,693
Inoue et al. [45] Date of Patent: Nov. 18, 1986

[54] ROOM TEMPERATURE-CURABLE ORGANOPOLYSILOXANE COMPOSITION

[75] Inventors: Yoshio Inoue; Takehide Okami; Koji Yokoo; Hitoshi Kinami, all of Gunma, Japan

[73] Assignee: Shin-Etsu Chemical Co., Ltd., Tokyo, Japan

[21] Appl. No.: 762,555

[22] Filed: Aug. 5, 1985

[30] Foreign Application Priority Data

Aug. 7, 1984 [JP] Japan ................... 59-165467

[51] Int. Cl.$^4$ .................................. C08K 3/02
[52] U.S. Cl. ................... 524/700; 524/783; 524/785; 524/786; 524/789; 524/859; 524/860; 525/100; 525/104; 525/106; 528/18; 528/33; 528/34; 528/901
[58] Field of Search ............ 528/18, 33, 34, 901; 525/100, 104, 106; 524/859, 860, 783, 789, 785, 786, 700

[56] References Cited

U.S. PATENT DOCUMENTS 3,109,826 11/1963 Smith .................. 528/18
4,434,283 2/1984 Sattlegger et al. .......... 528/18
4,523,001 6/1985 Swiger .................. 528/18

Primary Examiner—Melvyn I. Marquis
Attorney, Agent, or Firm—Toren, McGeady, Stanger, Goldberg & Kiel

[57] ABSTRACT

The room temperature-curable organopolysiloxane composition of the invention is characteristic in the remarkably increased adhesive bonding strength of the rubber of the composition to the surface of a substrate of metals, plastics and others on which the composition has been cured. The composition is also advantageous in the improved thixotropy despite the admixture of an adhesion improver mentioned below. Thus, the composition comprises, in addition to conventional components in a deacidification type room temperature curable organopolysiloxane composition, a specific organic silicon compound represented by the general formula

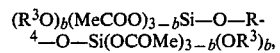

$(R^3O)_b(MeCOO)_{3-b}Si-O-R^4-O-Si(OCOMe)_{3-b}(OR^3)_b$, in which $R^3$ is a monovalent hydrocarbon group, $R^4$ is a divalent hydrocarbon group or a polyoxyalkylene group of the formula $-(C_xH_{2x}-O)_{\overline{n}}C_xH_{2x}-$, x being 2 to 4 and n being a positive integer, and b is 1 or 2.

4 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition having an improved rheological property of thixotropy and capable of being cured at room temperature by the mechanism of deacidification into a silicone rubber which can be firmly bonded adhesively to the surface of various kinds of substrate materials such as metals and plastics on which the composition has been cured.

There are known various types of room temperature-curable or vulcanizable organopolysiloxane compositions, referred to as RTV compositions hereinbelow, capable of being cured at room temperature into a silicone rubber differing in the formulation and mechanism of the crosslinking reaction. Among the RTV compositions of different types, one of the most widely used types includes those acurable by the mechanism of a condensation reaction to produce a carboxylic acid as a byproduct and they are widely used as a caulking and sealing material, for example, in building and construction works and electric and electronic instruments.

Notwithstanding the generally very excellent properties of the RTV compositions of the deacidification type as mentioned above, the RTV compositions usually involves a problem in the adhesive bonding of the cured silicone rubber to the substrate surface on which the composition has been cured. Although considerably good adhesive bonding can be obtained between the RTV composition and the surface of a substrate of, for example, glass and ceramic materials, namely, the adhesive bonding strength can be not always satisfactorily high on to the surface of a metal or plastic resin as well as on to the surface coated with a coating composition such as a paint though dependent on the surface condition. Furthermore, even the adhesive bonding strength with a glass or ceramic material may be remarkably decreased when the bonded articles are dipped in water prolongedly. Therefore, it is usually essential to subject the surfaces to be bonded together to a treatment with a primer before adhesively bonding with the RTV composition. Even by setting aside the problem of difficulty in the appropriate selection of a primer in relation to the material of the substrate, disadvantages are unavoidable in the use of a primer that the coating works with a primer are usually very troublesome sometimes leaving uncoated areas on the substrate surface to cause uneven adhesive bonding. Moreover, certain kinds of substrate materials are subject to the attack of the organic solvent usually contained in the primer composition in the form of a solution so that cracks are formed on the substrate surface or the mechanical strength of the substrate is greatly decreased.

Accordingly, a proposal is made in Japanese Patent Publications Nos. 49-7578, 49-30693 and 55-22512 according to which a RTV composition of the deacidification type is admixed with di-tert-butoxy diacetoxy silane, 3-glycidyloxypropyl trimethoxy silane or the like as an adhesion aid. The addition of these silane compounds is, however, detrimental in respect of the rheological properties of the composition such as thixotropy though effective to some extent in respect of the improvement of the adhesive bonding. This drawback accompanying the addition of the adhesion aid can be remedied by the admixture of a thixotropy-improver though again with sacrifice of the adhesive bonding strength.

SUMMARY OF THE INVENTION

The present invention therefore has an object to provide a room temperature-curable organopolysiloxane composition or RTV composition free from the above described problems and disadvantages in the prior art and the RTV composition of the invention comprises:

(a) 100 parts by weight of a diorganopolysiloxane terminated at both molecular chain ends each with a silanolic hydroxy group;

(b) from 1 to 25 parts by weight of an acyloxysilane compound represented by the general formula

$$R^1_a Si(OCOR^2)_{4-a}, \qquad (I)$$

in which $R^1$ is a substituted or unsubstituted monovalent hydrocarbon group, $R^2$ is a substituted or unsubstituted monovalent hydrocarbon group having 1 to 30 carbon atoms and the suffix a is zero or 1, or a partial hydrolysis-condensation product thereof;

(c) from 0.01 to 10 parts by weight of an organotin compound;

(d) from 0.2 to 10 parts by weight of an organic silicon compound represented by the general formula

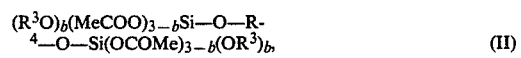

$$(R^3O)_b(MeCOO)_{3-b}Si-O-R^4-O-Si(OCOMe)_{3-b}(OR^3)_b, \qquad (II)$$

in which Me is a methyl group, $R^3$ is a substituted or unsubstituted monovalent hydrocarbon group, $R^4$ is a divalent hydrocarbon group or a polyoxyalkylene group of the formula $-(C_xH_{2x}-O)_{\overline{n}}C_xH_{2x}-$, x being a positive integer of 2 to 4 and n being a positive integer not exceeding 1000, and b is 1 or 2; and (e) from 5 to 300 parts by weight of a filler.

DETAILED DESCRIPTION OF THE PREFERRED EMBODIMENTS

As is understood from the above given summarizing description, the most characteristic component in the inventive RTV composition is the special organosilicon compound as the component (d) represented by the general formula (II), by the addition of which a very remarkable improvement can be obtained in the adhesive bonding of the cured RTV composition to the surface of a substrate of a metal or plastic as well as glass and ceramic even in dipping in water in addition to the good thixotropy of the composition.

The base component in the inventive RTV composition is the diorganopolysiloxane as the component (a) which is conventional in the prior art silicone RTV compositions. The diorganopolysiloxane should be terminated at both molecular chain ends each with a silanolic hydroxy group, i.e. a hydroxy group directly bonded to the silicon atom. The organic groups bonded to the silicon atoms of the diorganopolysiloxane are each a monovalent hydrocarbon group without particular limitation. Exemplary of the monovalent hydrocarbon group are alkyl groups, e.g. methyl, ethyl, propyl and butyl groups, cycloalkyl groups, e.g. cyclopentyl and cyclohexyl groups, alkenyl groups, e.g. vinyl and allyl groups, aryl groups, e.g. phenyl, tolyl and naphthyl groups, and aralkyl groups, e.g. benzyl and 2-phenylethyl groups, as well as those substituted monovalent hydrocarbon groups obtained by the replacement of a part or all of the hydrogen atoms in the above named hydrocarbon groups with substituent atoms or groups such as halogen, e.g. chlorine, atoms, amino groups and the like.

The diorganopolysiloxane should have a degree of polymerization sufficient to give a viscosity thereof in the range from 100 to 1,000,000 centistokes or, preferably, from 1000 to 50,000 centistokes at 25° C. When the viscosity of the component (a) is too low, the RTV composition formulated therewith cannot give a cured rubber having sufficiently high mechanical strengths. When the viscosity of the component (a) is too high, on the other hand, the RTV composition formulated therewith may have an unduly high consistency with consequently low workability in use.

The component (b) is an acyloxysilane compound which serves as a crosslinking agent of the component (a) by reacting with the silanolic hydroxy groups at the molecular chain ends thereof.

The acyloxysilane compound as the component (b) is represented by the general formula (I) given above, in which $R^1$ is a substituted or unsubstituted monovalent hydrocarbon group exemplified by alkyl groups, e.g. methyl, ethyl, propyl and butyl groups, alkenyl groups, e.g. vinyl and allyl groups, aryl groups, e.g. phenyl and tolyl groups, and aralkyl groups, e.g. benzyl and 2-phenylethyl groups, as well as those substituted groups obtained by the replacement of a part or all of the hydrogen atoms in the above named hydrocarbon groups with substituent atoms or groups such as halogen atoms and nitrile groups. The groups $R^1$ are preferably selected from the class consisting of methyl, ethyl, phenyl and vinyl groups. The group denoted by $R^2$ in the general formula (I) is a substituted or unsubstituted monovalent hydrocarbon group having from 1 to 30 carbon atoms which may be the same as or different from the group denoted by $R^1$ in the same molecule. The group $R^2$ is preferably a methyl group so that the acyloxysilane compound of the formula (I) is an acetoxysilane. The suffix a is zero or 1. A partial hydrolysis-condensation product of the above defined acyloxysilane compound also can be used as the component (b).

Several of the particular examples of the acyloxysilane compound as the component (b) include those expressed by the following structural formulas, denoting methyl, ethyl, vinyl, n-butyl, n-pentyl, phenyl and acetyl groups with Me, Et, Vi, Bu, Pn, Ph and Ac, respectively:

MeSi(OAc)₃; EtSi(OAc)₃; ViSi(OAc)₃; PhSi(OAc)₃; CF₃C₂H₄Si(OAc)₃; MeSi(O—CO—Pn)₃; Si(O—CO—Pn)₄; PhSi(O—CO—Pn)₃; NC—C₂H₄Si(O—CO—Pn)₃; MeSi(O—CO—CHEtBu)₃; ViSi(O—CO—CHEtBu)₃; and MeSi(O—CO—Ph)₃.

The amount of the component (b) in the inventive RTV composition should be in the range from 1 to 25 parts by weight or, preferably, from 2 to 15 parts by weight per 100 parts by weight of the component (a). When the amount of the component (b) as the crosslinking agent is too small, the RTV composition would have no satisfactory curability as a matter of course. When the amount of the component (b) is too large, on the other hand, the RTV composition may give a cured product having inferior physical properties as a rubber in addition to an excessively large shrinkage of the composition by curing.

The component (c), which is an organic tin compound, serves as a catalyst to accelerate the condensation reaction between the components (a) and (b) for the crosslink formation in the presence of atmospheric moisture. The organic tin compound may be selected from known ones including tin naphthenate, tin caprylate, tin oleate and the like carboxylates, dibutyltin diacetate, dibutyltin dioctoate, dibutyltin dilaurate, dibutyltin dioleate, dioctyltin diacetate, diphenyltin diacetate, tin octoate, dibutyltin dibenzyl maleate, dibutyltin dihexyl maleate, bis(methylmaleate dibutyltin) oxide, dibutyltin dioxide, dibutyltin dimethoxide, dibutyl bis(triethoxysiloxy) tin and the like.

The amount of the component (c) as the curing catalyst in the inventive RTV composition should be in the range from 0.01 to 10 parts by weight or, preferably, from 0.01 to 1 part by weight per 100 parts by weight of the component (a). When the amount of the compoennt (c) is too small, acceleration of the crosslinking reactiion is insufficient so that an unduly long time is taken in the curing of the RTV composition. When the amount of the component (c) is too large, on the other hand, the RTV composition may have a problem in respect of the decreased stability in storage.

The component (d) is the most characteristic component in the inventive RTV composition and serves to increase the adhesive bonding strength of the inventive RTV composition and also to impart adequate thixotropy to the composition. The component (d) is an organosilicon compound represented by the general formula (II) given before. In the formula, $R^3$ is a substituted or unsubstituted monovalent hydrocarbon group selected from the same class as that given as the examples of the group denoted by $R^1$ in the general formula (I). The group denoted by $R^4$ in the general formula (II) is a divalent hydrocarbon group, on one hand, selected from the class consisting of alkylene groups, e.g. methylene, ethylene and propylene groups, and phenylene group or a polyoxyalkylene group, on the other hand, expressed by the general formula

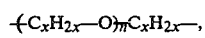

in which x is 2, 3 or 4 and n is a positive integer not exceeding 1000. The suffix b in the general formula (II) is 1 or 2 or, preferably, 1.

Several of the particular examples of the organosilicon compound as the component (d) include those expressed by the following structural formulas, in which Me, Et, Bu, Ph and Ac each have the meaning as defined already:

(MeO)(AcO)₂Si—O—CH₂CH₂—O—Si(OAc)₂(OMe);
(MeO)(AcO)₂Si—O—CH₂CH₂CH₂—O—Si(OAc)₂(OMe);
(MeO)₂(AcO)Si—O—CH₂CH₂—O—Si(OAc)(OMe):
(MeO)(BuEtCH—CO—O)₂Si—O—CH₂CH₂—O—Si(O—CO—CHEtBu)₂(OMe);
(Me₃CO)(AcO)₂Si—O—CH₂CH₂—O—Si(OAc)₂(OCMe₃);
(Me₃CO)(AcO)₂Si—O—CH₂CH₂CH₂—O—Si(OAc)₂(OCMe₃);
(Me₃CO)₂(AcO)Si—O—CH₂CH₂—O—Si(OAc)(OCMe₃)₂;
(Me₃CO)(BuEtCH—CO—O)₂Si—O—CH₂CH₂—O—Si(O—CO—CHEtBu)₂(OCMe₃);
(Me₃CO)(Ph—CO—O)₂Si—O—CH₂CH₂—O—Si(O—CO—Ph)₂(OCMe₃);
(Me₃CO)(AcO)₂Si—O+CH₂CH₂—O)₄Si(OAc)₂(OCMe₃);

$(Me_3CO)(AcO)_2Si-O+C_3H_6-O)_{\overline{10}}Si(OAc)_2(OCMe_3)$;

$(Me_3CO)_2(AcO)Si-O+CH_2CH_2-O)_{\overline{100}}Si(OAc)(OCMe_3)_2$;

$(Me_3CO)_2(AcO)Si-O+CH_2CH_2-O)_{\overline{10}}Si(OAc)(OCMe_3)_2$; and $(Me_3CO)(AcO)_2Si-O+C_3H_6-O)_{\overline{200}}Si(OAc)_2(OCMe_3)$.

The organosilane compound as the component (d) can be prepared, for example, by a procedure in which a mole of tetraacetoxy silane is reacted with 1.0 to 2.0 moles of a monohydric alcohol followed by the reaction with 0.3 to 0.5 mole of a dihydric alcohol or a polyoxyalkylene glycol having hydroxy groups at the molecular chain terminals. The reaction may be performed in an organic solvent.

The amount of the organosilicon compound as the component (d) in the inventive RTV composition should be in the range from 0.2 to 10 parts by weight or, preferably, from 0.5 to 3 parts by weight per 100 parts by weight of the component (a). When the amount thereof is too small, no sufficient effects as desired can be obtained in the improvements of the adhesive bonding strength and thixotropy of the composition as a matter of course. When the amount thereof is too large, on the other hand, the curing velocity of the RTV composition may be somewhat decreased while no further improvement can be obtained in the adhesive bonding strength by using such an increased amount of the organosilicon compound rather with an economical disadvantage.

The filler as the component (e) is not particularly limitative and various kinds of known powdery materials can be used as the filler. Some of the examples of the filler include fumed silica which may be surface-treated with hexamethyldisilazane or a cyclic dimethylpolysiloxane according to need, precipitated silica, quartz powder, diatomaceous earth, titanium dioxide, aluminum oxide, lead oxide, iron oxide, carbon black, graphite powder, mica flakes, clay, glass beads, glass microballoons, glass fiber, fine beads of synthetic resins, e.g. polyvinyl chloride, polystyrene and acrylic resins, and the like.

The amount of the filler in the inventive RTV composition should be in the range from 5 to 300 parts by weight or, preferably, from 50 to 150 parts by weight per 100 parts by weight of the component (a). When the amount of the filler is too small, no adequate thixotropy can be imparted to the composition even by the admixture of the above described component (d) and the RTV composition cannot give a cured elastomer having sufficiently high mechanical strengths. When the amount of the filler is too large, on the other hand, the cured elastomer of the RTV composition would have an excessively large elastic modulus with a low value of ultimate elongation at break.

The RTV composition of the invention can be obtained by uniformly blending the above described components (a) to (e) in a suitable blending machine under a moisture-free condition. It is of course optional according to need that the inventive RTV composition is admixed with various kinds of known additives including plasticizers, coloring agents, e.g. pigments, flame retardant agents, thixotropy improvers, bactericidal and fungicidal agents, heat-resistance improvers, ultraviolet absorbers and the like though each in a limited amount not to adversely affect the performance of the inventive RTV composition.

The inventive RTV composition prepared by blending all of the essential components can be stored in a package with stability over a long period of time when kept under a hermetically sealed condition to exclude atmospheric moisture. When exposed to an atmosphere containing moisture, the RTV composition is cured into a rubbery elastomer so that the RTV composition is useful as a sealing or caulking material in the interior and exterior finishing of buildings. The RTV composition can be used also as a coating material by dissolving or dispersing in an organic solvent such as aromatic hydrocarbons, halogenated hydrocarbons and the like to give a dispersion suitable for application to the surface of an article by brush coating, roller coating, spray coating and the like conventional coating method to give a coating layer which can be cured after evaporation of the solvent.

In the following, examples and comparative examples are given to illustrate the inventive RTV composition in more detail as preceded by the description of the preparation of the organosilicon compounds used as the component (d). In the following description, the expression of "parts" always refers to "parts by weight" and the value of th viscosity is that obtained by the measurement at 25° C. at each occurrence.

PREPARATION 1

Into a mixture of 66 g (0.25 mole) of tetraacetoxy silane and 100 g of methyl ethyl ketone heated at 30° to 40° C. were gradually added dropwise 16 g (0.5 mole) of methyl alcohol to effect the reaction. After completion of the reaction, a solution of 7.8 g (0.125 mole) of ethyleneglycol in 100 g of methyl ethyl ketone was added dropwise into the reaction mixture over a period of 30 minutes and then the reaction mixture was agitated for 2 hours at 40° to 50° C. to complete the reaction. Thereafter, the reaction mixture was subjected to stripping to remove volatile materials, i.e. the solvent and the unreacted starting compounds, at 60° C. for 3 hours under a pressure of 5 mmHg to give 43 g of a liquid product, which had a viscosity of 31 centistokes, refractive index $n_D$ of 1.410 and density of 1.12 and contained 0.54 mole of acetoxy groups per 100 g. This product, referred to as Silane I hereinbelow, could be identified by analysis to be a compound expressed by the structural formula $(MeO)_2(AcO)Si-O-CH_2CH_2-O-Si(OAc)(OMe)_2$.

PREPARATION 2

The experimental procedure was substantially the same as in Preparation 1 described above except that 16 g of methyl alcohol were replaced with 37 g (0.5 mole) of tert-butyl alcohol to give 64 g of a liquid product. The liquid product had a viscosity of 40 centistokes, refractive index $n_D$ of 1.413 and density of 1.13 and contained 0.38 mole of acetoxy groups per 100 g. This product, referred to as Silane II hereinbelow, could be identified by analysis to be the compound expressed by the structural formula $(Me_3CO)_2(AcO)Si-O-CH_2CH_2-O-Si(OAc)(OCMe_3)_2$.

PREPARATION 3

The experimental procedure was substantially the same as in Preparation 1 described above except that 16 g of methyl alcohol were replaced with 37 g (0.5 mole) of tert-butyl alcohol and 7.8 g of ethyleneglycol were replaced with 19 g (0.125 mole) of propyleneglycol to give 66 g of a liquid product. The liquid product had a viscosity of 73 centistokes, refractive index $n_D$ of 1.415 and density of 1.14 and contained 0.53 mole of acetoxy groups per 100 g. This product, referred to as Silane III hereinbelow, could be identified by analysis to be the compound expressed by the averaged structural formula $(Me_3CO)_{1.6}(AcO)_{1.4}Si-O-CH_2CH_2CH_2-O-Si(OAc)_{1.4}(OCMe_3)_{1.6}$.

PREPARATION 4

The experimental procedure was substantially the same as in Preparation 1 described above except that 16 g of methyl alcohol were replaced with 37 g (0.5 mole) of tert-butyl alcohol and 7.8 g of ethyleneglycol were replaced with 24 g (0.125 mole) of a polyoxyethylene glycol expressed by an average molecular formula $HO(C_2H_4O)_4H$ to give 76 g of a liquid product. The liquid product had a viscosity of 253 centistokes, refractive index $n_D$ of 1.431 and density of 1.21 and contained 0.30 mole of acetoxy groups per 100 g. This product, referred to as Silane IV hereinbelow, could be identified by analysis to be an organosilicon compound expressed by the structural formula $(Me_3CO)_2(AcO)Si-O+CH_2CH_2-O)_4Si(OAc)(OCMe_3)_2$.

EXAMPLE 1

A RTV composition, referred to as Composition I hereinbelow, was prepared by uniformly blending 100 parts of a dimethylpolysiloxane having a viscosity of 20,000 centistokes and terminated at both molecular chain ends each with a silanolic hydroxy group, 10 parts of a hydrophobic fumed silica filler after surface treatment with hexamethyldisilazane and 0.1 part of dibutyltin dioctoate followed by further admixture of 5 parts of methyl triacetoxysilane and 1.0 part of the Silane II prepared in Preparation 2 under an anhydrous condition with subsequent defoaming.

A pair of test panels of a material indicated in Table 1 below each having a width of 25 mm, length of 100 mm and thickness of 1 to 5 mm and cleaned in advance using ethyl alcohol were laid one on the other overlapping at the 10 mm long end portions alone where they were bonded together adhesively with a layer of the Composition I therebetween which was cured by keeping for 7 days at 20° C. in an atmosphere of 55% relative humidity. The thus prepared test specimens were subjected to the test of shearing adhesion by pulling lengthwise at a velocity of 50 mm/minute either as bonded or after dipping in water at 50° C. for 7 days following the 7 days curing to give the results shown in Table 1.

Separately, the Composition I was shaped and cured into a rubber sheet having a thickness of 2 mm by keeping for 7 days at 20° C. in an atmosphere of 55% relative humidity and the mechanical properties of this cured sheet were determined by use of dumbbell-shaped test pieces according to the procedure specified in JIS K 6301 to give the results shown in Table 1 which also includes the result of the slump test of the composition according to the procedure specified in JIS A 5758.

For comparison, RTV compositions, referred to as Compositions A and B hereinbelow, were prepared with the same formulation as in Camposition I excepting the omission of the Silane II as an adhesion aid and replacement of the Silane II with the same amount of di-tert-butoxy diacetory silane, respectively. These comparative RTV compositions were subjected to the same tests as with the Composition I for the shearing adhesion of the test panels, mechanical properties of the cured rubber sheets and slump of the compositions to give the results shown in Table 1.

TABLE 1

| Composition | | | I | A | B |
|---|---|---|---|---|---|
| Shearing adhesion, bonding strength in kg/cm²/ cohesive failure in % | Glass | As cured | 11/100 | 11/100 | 10/100 |
| | | Dipped in water | 9.7/100 | 4.3/30 | 9.8/100 |
| | Tin-plated steel | As cured | 12/100 | 7.2/30 | 11/100 |
| | | Dipped in water | 9.7/100 | 5.1/0 | 7.5/100 |
| | Stainless steel | As cured | 11/100 | 3.4/10 | 8.1/80 |
| | | Dipped in water | 9.1/100 | 1.3/0 | 4.3/40 |
| | Aluminum | As cured | 9.9/100 | 5.4/20 | 11/100 |
| | | Dipped in water | 8.1/100 | 2.1/0 | 9.2/80 |
| Slump test, mm | | | 0 | 15 | 10 |
| Mechanical properties | Hardness (JIS) | | 26 | 28 | 24 |
| | Ultimate elongation, % | | 420 | 380 | 400 |
| | Tensile strength, kg/cm² | | 18 | 20 | 15 |

EXAMPLES 2 to 5

RTV compositions, referred to as Compostions II and III, were prepared each by uniformly blending 100 parts of a dimethylpolysiloxane having a viscosity of 30,000 centistokes and terminated at both molecular chain ends each with a silanolic hydroxy group, 12 parts of a hydrophobic fumed silica filler after surface treatment with a chlorosilane and 0.15 part of dibutyltin dioctoate followed by further admixture of 5 parts of vinyl tris(2-ethylhexoxy)silane and 0.5 part or 0.1 part, respectively, of the Silane I prepared in Preparation 1 described above. Three more RTV compositions, referred to as Compositions IV, V and VI hereinbelow, were prepared each with the same formulation as above excepting the replacement of the Silane I with 0.5 part or 1.0 part of the Silane III prepared in Preparation 3 for the Compositions IV and V, respectively, or with 1.0 part of the Silane IV prepared in Preparation 4 for the Composition VI.

For comparison, another RTV composition, referred to as Composition C hereinbelow, was prepared with the same formulation as above excepting the omission of the Silanes I to IV.

These RTV compositions were subjected to the same tests as in Example 1 for the shearing adhesion of the test specimens either as cured or after dipping in water, mechanical properties of the cured rubber sheets of the compositions and slump values of the compositions to give the results shown in Table 2 below.

TABLE 2

| Composition | | | II | III | IV | V | VI | C |
|---|---|---|---|---|---|---|---|---|
| Shearing adhesion, kg/cm²/ cohesive failure, % | Glass | As cured | 9.8 | 9.7 | 10 | 11 | 9.9 | 9.8 |
| | | | 100 | 100 | 100 | 100 | 100 | 100 |
| | | Dipped in water | 9.6 | 9.6 | 10 | 10 | 9.7 | 7.9 |
| | | | 100 | 100 | 100 | 100 | 100 | 70 |
| | Aluminum | As cured | 8.2 | 9.7 | 9.3 | 10 | 9.8 | 9.6 |
| | | | 90 | 100 | 100 | 100 | 100 | 90 |
| | | Dipped in water | 6.5 | 9.3 | 8.1 | 10 | 9.6 | 4.2 |
| | | | 50 | 90 | 90 | 100 | 100 | 20 |
| Slump test, mm | | | 1 | 0 | 0 | 0 | 0 | 10 |
| Mechanical properties | Hardness (JIS) | | 27 | 27 | 29 | 29 | 26 | 26 |
| | Ultimate elongation, % | | 370 | 380 | 400 | 410 | 390 | 430 |
| | Tensile strength, kg/cm² | | 19 | 20 | 21 | 22 | 20 | 19 |
| Proper- | 50% modulus, | | 3.6 | 3.6 | 3.7 | 3.5 | 3.5 | 3.5 |

TABLE 2-continued

| Composition | | II | III | IV | V | VI | C |
|---|---|---|---|---|---|---|---|
| ties of glass blocks, as cured/ dipped in water | kg/cm² | 3.4 | 3.5 | 3.6 | 3.6 | 3.5 | 3.4 |
| | Maximum tensile strength, kg/cm² | 8.1 | 8.5 | 9.2 | 10.3 | 8.7 | 6.8 |
| | | 7.7 | 8.2 | 9.0 | 9.6 | 8.0 | 5.1 |
| | Elongation at maximum load, % | 170 | 180 | 190 | 210 | 200 | 130 |
| | | 160 | 170 | 190 | 200 | 170 | 90 |
| | Cohesive failure % | 100 | 100 | 100 | 100 | 100 | 80 |
| | | 70 | 100 | 90 | 100 | 100 | 0 |

What is claimed is:
1. A room temperature-curable organopolysiloxane composition which comprises:
   (a) 100 parts by weight of a diorganopolysiloxane terminated at both molecular chain ends each with a silanolic hydroxy group;
   (b) from 1 to 25 parts by weight of an acyloxysilane compound represented by the general formula

$R^1{}_a Si(OCOR^2)_{4-a}$, in which $R^1$ is a substituted or unsubstituted monovalent hydrocarbon group, $R^2$ is a substituted or unsubstituted monovalent hydrocarbon group having 1 to 30 carbon atoms and the suffix a is zero or 1, or a partial hydrolysis-condensation product thereof;
   (c) from 0.01 to 10 parts by weight of an organotin compound;
   (d) from 0.2 to 10 parts by weight of an organic silicon compound represented by the general formula $(R^3O)_b(MeCOO)_{3-b}Si-O-R^4-O-Si(OCOMe)_{3-b}(OR^3)_b$, in which Me is a methyl group, $R^3$ is a substituted or unsubstituted monovalent hydrocarbon group, $R^4$ is a divalent hydrocarbon group or a polyoxyalkylene group of the formula $-(C_xH_{2x}-O)_{\overline{n}}C_xH_{2x}-$, x being a positive integer of 2, 3 or 4 and n being a positive integer not exceeding 1000, and b is 1 or 2; and
   (e) from 5 to 300 parts by weight of a filler.

2. The room temperature-curable organopolysiloxane composition as claimed in claim 1 wherein the acyloxysilane as the component (b) is a triacetoxysilane represented by the general formula $R^1Si(OCOMe)_3$.

3. The room temperature-curable organopolysiloxane composition as claimed in claim 1 wherein the organic silicon compound as the component (d) is a compound represented by the general formula $(R^3O)(MeCOO)_2Si-O-CH_2CH_2-O-Si(OCOMe)_2(OR^3)$.

4. The composition of claim 1 wherein the organotin compound is selected from the group consisting of tin naphthenate, tin carpylate, tin oleate, dibutyltin diacetate, dibutyltin dioctoate, dibutyltin dilaurate, dibutyltin dioleate, dioctyltin diacetate, diphenyltin diacetate, tin octoate, dibutyltin dibenzyl maleate, dibutyltin dihexyl maleate, bis(methylmaleate dibutyltin) oxide, dibutyltin dioxide, dibutyltin dimethoxide, and dibutyl bis(triethoxysiloxy) tin.

* * * * *